United States Patent
Zavesky et al.

(10) Patent No.: US 9,569,832 B2
(45) Date of Patent: Feb. 14, 2017

(54) OBJECT BASED IMAGE PROCESSING

(71) Applicant: AT&T Intellectual Property I, L.P., Atlanta, GA (US)

(72) Inventors: Eric Zavesky, Austin, TX (US); David Crawford Gibbon, Lincroft, NJ (US); Lee Begeja, Gillette, NJ (US); Amy Ruth Reibman, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/181,045

(22) Filed: Jun. 13, 2016

(65) Prior Publication Data

US 2016/0292843 A1    Oct. 6, 2016

Related U.S. Application Data

(63) Continuation of application No. 14/500,689, filed on Sep. 29, 2014, now Pat. No. 9,396,409.

(51) Int. Cl.
| | |
|---|---|
| *G06K 9/56* | (2006.01) |
| *G06T 7/00* | (2006.01) |
| *G06K 9/62* | (2006.01) |
| *G06K 9/46* | (2006.01) |

(52) U.S. Cl.
CPC ........... *G06T 7/0002* (2013.01); *G06K 9/4642* (2013.01); *G06K 9/6202* (2013.01); *G06T 2207/30168* (2013.01); *G06T 2207/30196* (2013.01); *G06T 2207/30201* (2013.01)

(58) Field of Classification Search
CPC ... G06K 9/6202; G06K 9/4642; G06T 7/0002; G06T 2207/30168

USPC 382/171, 209, 260, 278, 282, 307; 358/537, 538, 452, 453
See application file for complete search history.

(56) References Cited

U.S. PATENT DOCUMENTS

| | | |
|---|---|---|
| 5,717,512 A * | 2/1998 | Chmielewski, Jr. ............... G02B 26/0816 348/E13.005 |
| 5,793,371 A | 8/1998 | Deering |
| 6,571,023 B1 | 5/2003 | Aizawa et al. |
| 6,768,811 B2 | 7/2004 | Dinstein et al. |
| 6,862,373 B2 | 3/2005 | Enomoto |

(Continued)

FOREIGN PATENT DOCUMENTS

| | | |
|---|---|---|
| EP | 2515526 A2 | 10/2012 |
| WO | 2011067767 A1 | 6/2011 |

OTHER PUBLICATIONS

Burt, P. et al., "Enhanced Image Capture Through Fusion", Proceedings, Fourth International Conference on computer Vision, IEEE, May 1993, pp. 173-182.

(Continued)

*Primary Examiner* — Yosef Kassa
(74) *Attorney, Agent, or Firm* — Toler Law Group, PC

(57) ABSTRACT

A method includes receiving image data corresponding to an image and determining object quality values based on a portion of the image data. The portion corresponds to an object represented in the image. The method also includes accessing object category metrics associated with an object category corresponding to the object. The method includes generating a notification indicating that the image data has been altered in response to a result of a comparison of the object quality values to the object category metrics. The result indicates alteration of the portion of the image data.

20 Claims, 6 Drawing Sheets

(56) References Cited

U.S. PATENT DOCUMENTS

| | | | |
|---|---|---|---|
| 6,900,841 B1 | 5/2005 | Mihara | |
| 7,127,261 B2* | 10/2006 | Van Erlach | G06Q 30/0239 455/41.2 |
| 7,164,955 B2 | 1/2007 | Moreas et al. | |
| 7,213,766 B2* | 5/2007 | Ryan | G06F 13/385 235/472.02 |
| 7,289,574 B2 | 10/2007 | Parolari | |
| 7,460,695 B2 | 12/2008 | Steinberg et al. | |
| 7,496,228 B2 | 2/2009 | Landwehr et al. | |
| 7,546,951 B2 | 6/2009 | Kotlarsky et al. | |
| 7,590,340 B2 | 9/2009 | Senba | |
| 7,721,301 B2 | 5/2010 | Wong et al. | |
| 7,729,532 B2 | 6/2010 | Tedesco et al. | |
| 7,762,470 B2* | 7/2010 | Finn | G06K 7/0004 235/380 |
| 7,792,378 B2 | 9/2010 | Liege et al. | |
| 7,886,972 B2 | 2/2011 | Skaaksrud et al. | |
| 7,916,951 B2 | 3/2011 | Landwehr et al. | |
| 7,936,370 B2 | 5/2011 | Renkis | |
| 7,954,129 B2 | 5/2011 | Renkis | |
| 8,035,726 B2 | 10/2011 | Matsumoto et al. | |
| 8,068,545 B2 | 11/2011 | Penna et al. | |
| 8,213,734 B2 | 7/2012 | Wernersson | |
| 8,253,796 B2* | 8/2012 | Renkis | G08B 13/19656 348/115 |
| 8,274,552 B2 | 9/2012 | Dahi et al. | |
| 8,401,233 B2 | 3/2013 | Tedesco et al. | |
| 8,542,871 B2* | 9/2013 | Voloshynovskiy | G07D 7/0046 283/113 |
| 8,553,949 B2 | 10/2013 | Steinberg et al. | |
| 8,605,203 B2 | 12/2013 | Wu et al. | |
| 8,659,697 B2 | 2/2014 | Capata et al. | |
| 8,786,959 B2 | 7/2014 | Wu et al. | |
| 2008/0084584 A1 | 4/2008 | Kauhanen | |
| 2013/0162782 A1 | 6/2013 | Kuo et al. | |
| 2013/0223759 A1 | 8/2013 | Nishiyama | |

OTHER PUBLICATIONS

Bouwmans, T. et al., "Background Modeling using Mixture of Gaussians for Foreground Detection—A Survey", Recent Patents on Computer Science 1, 3 (2008), pp. 219-237.

Eltoukhy, H. et al., "A Computationally Efficient Algorithm for Multi-Focus Image Reconstruction", Electronic Imaging 2003, International Society for Optics and Photonics, 2003, pp. 332-341.

Bertalmio, M. et al., "Real-time, Accurate Depth of Field using Anisotropic Diffusion and Programmable Graphics Cards", Proceedings, 2nd International Symposium on 3D Data Processing, Visualization and Transmission, 3DPVT 2004, IEEE, Sep. 2004, pp. 767-773.

Raskar, R. et al., "Coded Exposure Photography: Motion Deblurring using Fluttered Shutter", ACM Transactions on Graphics (TOG) 25.3, (2006), pp. 795-804.

Wang, J. et al., "Unsupervised Multiresolution Segmentation for Images with Low Depth of Field", IEEE Transactions pn Pattern Analysis and Machine Intelligence, vol. 23, No. 1, Jan. 2001, pp. 85-90.

* cited by examiner ated of, U.S. patent application Ser. No. 14/500,689, filed on
OBJECT BASED IMAGE PROCESSING

CLAIM OF PRIORITY

This application claims priority from, and is a continuation of, U.S. patent application Ser. No. 14/500,689, filed on Sep. 29, 2014, which is incorporated herein by reference in its entirety.

FIELD OF THE DISCLOSURE

The present disclosure is generally related to object based image processing.

BACKGROUND

Conventional image quality detection mechanisms are either global (e.g., to assess the quality of an entire image or video) or local (e.g., to assess the quality of a portion of the image or video). When an image includes multiple objects, such as a first object (e.g., a chair) that is blurry and a second object (e.g., a person) that is clear, the conventional image quality detection mechanisms are unable to account for differences in image quality of the different objects.

DETAILED DESCRIPTION

Figure 1:
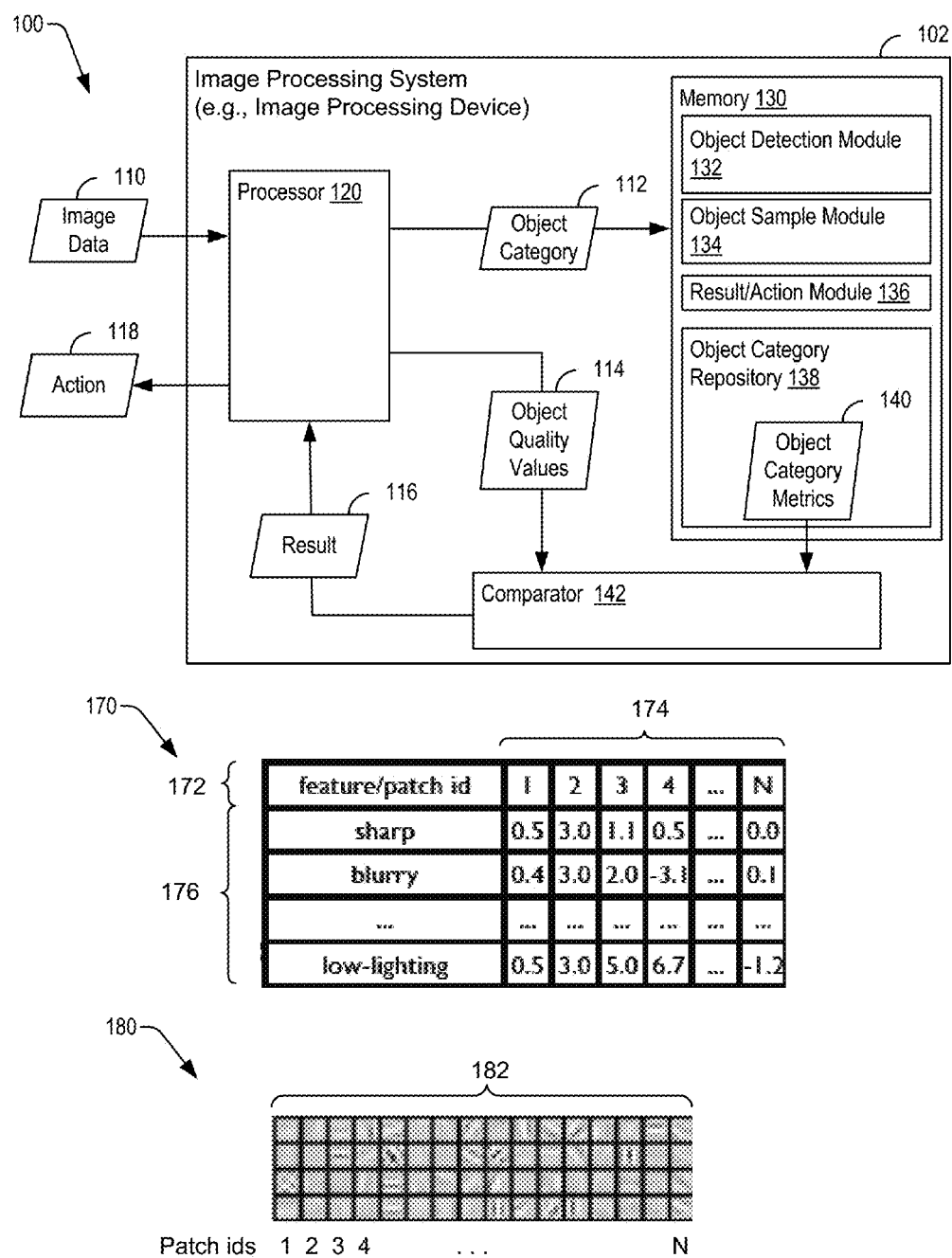
FIG. 1 is a block diagram of an embodiment of an image processing system to perform image processing based on an object category.

Image quality assessment of an image may be performed on an object-by-object basis for individual objects within the image, as described further herein. For example, a quality assessment of the image may be based on representations of known-object descriptors of visual quality (e.g., learned object-based quality descriptors). An object may be a single physical entity (e.g., a person, a car, etc.), or the object may be a set of physical entities (e.g., the background of a scene). Performing image quality assessment of an image on an object-by-object basis may improve assessment (and/or correction) of image quality of the image.

Object-by-object image quality assessment may be performed by an image processing device, such as a camera, a media display device, etc. The image processing device may receive image data corresponding to an image and may detect an object that is represented within the image. For example, the image processing device may use a segmentation process to identify boundary pixels of the object within the image data. The image processing device may determine (e.g., identify) an object category corresponding to the object. The image processing device may also select a portion of the image data, such as a set of pixels that corresponds to the object.

The image processing device may access object category metrics based on the object category of the object. The object category metrics may include a sharpness metric, a blurriness metric, a low-lighting metric, a texture metric, a color metric, a smoothness metric (or blockiness metric), one or more other metrics, or a combination thereof, In some embodiments, the object category metrics may include, for example, quality coefficients associated with the object category. To illustrate, the image processing device may access a collection of metrics that is indexed using different object categories. The image processing device may also determine quality values (e.g., a sharpness value, a blurriness value, particular quality coefficients, etc.) based on the portion of the image data corresponding to the object. The image processing device may compare the quality values (based on the portion) to the object category metrics (e.g., learned original quality coefficients that define the object) associated with the object category.

The image processing device may generate an output (e.g., initiate an action) based on the comparison of the quality values of the portion of the image data (corresponding to the object) and the quality values of the object category metrics. For example, the image processing device may generate an output that modifies parameters associated with image processing of the image. Additionally or alternatively, the image processing device may generate (based on the comparison) an output that modifies image data corresponding to the object. Additionally or alternatively, the image processing device may provide a notification based on a result of the comparison.

In a particular embodiment, a method includes receiving image data corresponding to an image and detecting an object represented within the image. The method further includes selecting a portion of the image data that corresponds to the object and determining object quality values based on the portion of the image data. The method also includes determining an object category corresponding to the object and accessing object category metrics associated with the object category. The method includes performing a comparison of the object quality values to the object category metrics associated with the object category and initiating an action based on the comparison.

In another particular embodiment, a system includes a processor and a memory accessible to the processor. The memory includes instructions that, when executed by the processor, cause the processor to execute operations including receiving image data corresponding to an image and detecting an object represented within the image. The operations further include selecting a portion of the image data that corresponds to the object and determining object quality values based on the portion of the image data. The operations also include determining an object category corresponding to the object and accessing object category metrics associated with the object category. The operations include performing a comparison of the object quality values to the object category metrics associated with the object category and initiating an action based on the comparison.

In another particular embodiment, a computer-readable storage device includes instructions executable by a processor to perform operations. The operations include receiving image data corresponding to an image and detecting an object represented within the image. The operations further include selecting a portion of the image data that corresponds to the object and determining object quality values based on the portion of the image data. The operations also include determining an object category corresponding to the object and accessing object category metrics associated with the object category. The operations include performing a comparison of the object quality values to the object category metrics associated with the object category and initiating an action based on the comparison.

FIG. 1 is a block diagram of a particular embodiment of a system 100 to perform image processing based on an object category of an object. The system 100 may include an image processing system 102 that is configured to receive image data 110. The image data 110 may be associated with an image, such as a single image, a frame of a video, or a sequence of video frames. The image processing system 102 may include or correspond to an image quality detection system that is configured to assess a quality of an image on an object-by-object basis for individual objects within the image. For example, the image processing system 102 may be configured to use known representations of object visual quality descriptors (e.g., learned object-based quality descriptors) to determine an image quality of an object within the image, as described further herein. The image processing system 102 may be included in or correspond to an image processing device, such as a camera, a media server, customer premises equipment, a media display device, a mobile communication device, a computer, or other device.

The image processing system 102 may include a processor 120, a memory 130, and a comparator 142. The processor 120 may be configured to receive image data 110. Although the processor 120 is illustrated as a single processor, in some embodiments the processor 120 may include multiple processors. For example, the processor 120 may be a single processor or multiple processors, such as a digital signal processor (DSP), a central processing unit (CPU), a graphical processing unit (GPU), or a combination thereof.

The image data 110 may correspond to an image. The image may include a two-dimensional image or a three-dimensional image. In some embodiments, the image may be associated with or correspond to a frame of a video. The image may include a representation of an object or multiple objects. An object may be a single physical entity (e.g., a person, a car, etc.) or a set of physical entities (e.g., a background of a scene). In some embodiments, an object may include or be made of multiple sub-objects, such a head of a person which includes eyes, a nose, a mouth, hair, etc.

The memory 130 may be accessible to the processor 120 and may store data including settings, media content (e.g., the image data 110), and other information. For example, the memory 130 may store data, such as an object category repository 138 that includes object category metrics 140 (e.g., object image metrics). The object category repository 138 may be indexed using different object categories (e.g., object types), where each object category corresponds to different object category metrics 140. For example, the object category repository 138 may include metrics for each of a number of objects that may be included in an image and may define an acceptable quality image of the object. For a particular object category, the object category metrics 140 may include a collection of metrics, such as known representations of object visual quality descriptors (e.g., learned object-based quality descriptors). Metrics for a particular object category may be accessed (and/or retrieved) based on identification of the particular object category. For the particular object category associated with the object category metrics 140, the object category metrics 140 may include a sharpness metric, a blurriness metric, a low-lighting metric, a texture metric, a color metric, a smoothness metric (or blockiness metric), one or more other metrics, or a combination thereof. In some embodiments, the object category metrics may include, for example, quality coefficients associated with the object category. The object category metrics 140 may be generated by a learning system, such as a learning system that is distinct from the image processing system 102, as described with reference to FIG. 3.

An example of the object category metrics 140 for a particular object category is depicted as table 170. A row 172 of the table includes feature/patch identifiers numbered 1-N (where N is a positive integer greater than one) that are included in columns 174. Each of the identifiers 1-N may correspond to a patch of a "basis" representation 180 of the particular object. The basis representation 180 may include columns 182 where each column represents a "patch" of an object associated with the particular object category. Thus, the particular object category may be represented by a single patch or of multiple patches of the basis representation. When the representation of the particular object category is composed of multiple patches, each patch may be associated with a corresponding coefficient (e.g., a weighted value). In a particular embodiment, each patch of the basis representation 180 is identified during a learning process using a training set of image, such as a set of good and/or high quality images. In another particular embodiment, the patches included in the basis representation 180 are identified during a learning processing using a variety of quality images (e.g., good quality, high quality, sharp quality, blurry quality, blocky quality, etc.).

Referring to the table 170, the table 170 includes rows 176 (e.g., entries) that indicate different visual qualities of the particular object category. Each entry includes coefficient values that may be applied to the patches (e.g., the columns) of the basis representation 180. For example, the "sharp" entry (e.g., a sharpness metric) includes a first coefficient value of 0.5 that corresponds to patch id 1, a second coefficient value of 3.0 that corresponds to patch id 2, a third coefficient value of 1.1 that correspond to patch id 3, a fourth coefficient value of 0.5 that corresponds to patch id 4, and an nth coefficient value of 0.0 that corresponds to patch id N. As another example, the "blurry" entry includes a first coefficient value of 0.4 that corresponds to patch id 1, a second coefficient value of 3.0 that corresponds to patch id 2, a third coefficient value of 2.0 that correspond to patch id 3, a fourth coefficient value of −3.1 that corresponds to patch id 4, and an nth coefficient value of 0.1 that corresponds to patch id N. As another example, the "low-lighting" entry includes a first coefficient value of 0.5 that corresponds to patch id 1, a second coefficient value of 3.0 that corresponds to patch id 2, a third coefficient value of 5.0 that correspond to patch id 3, a fourth coefficient value of 6.7 that corresponds to patch id 4, and an nth coefficient value of −1.2 that corresponds to patch id N. Although the coefficient values are described as each having a single value, in some embodiments at least one of the coefficient values of an entry may include a range of coefficient values.

The data stored in the memory 130 may also include instructions executable by the processor 120 to perform operations. For purposes of description, instructions for the processor 120 are illustrated in FIG. 1 as organized in functional modules. For example, the memory 130 may include an object detection module 132, an object sample module 134, and a result/action module 136, as illustrative, non-limiting examples. In some implementations, one or more of the modules stored in the memory 130, such as the object detection module 132, the object sample module 134, and/or the result/action module 136, may be loaded from the memory 130 into the processor 120 and may be executed by the processor 120. Although the memory 130 is illustrated as a single memory, in some embodiments the memory 130 may include multiple memories.

The object detection module 132 may be executed by the processor 120 to detect an object or multiple objects based on the image data 110. The object or the multiple objects may be included within (e.g., represented by) an image that corresponds to the image data 110. To detect an object, the processor 120 may be configured to perform a segmentation operation, a filtering operation, a line detection operation, an edge detection operation, or a combination thereof, on the image data 110. For example, after receiving the image data 110, the processor 120 may perform a segmentation process to identify boundary pixels of the object within the image data 110. In addition to detecting the object, the processor 120 may be configured to process the image data 110 to identify an object type (e.g., an object category 112) of the object. To illustrate, the object category 112 may be a face category, a car category, a chair category, a tree category, etc. The processor 120 may be configured to access the object category metrics 140 based on the object category 112. In some embodiments, the processor 120 may send the object category 112 to the memory 130 to cause the memory 130 to provide object category metric data (e.g., the object category metrics 140 corresponding to the object category 112) to the comparator 142.

In some embodiments, detecting the object and identifying the object category 112 may be performed concurrently. For example, an object that is detected by a face detection process may be inferred to belong to a face object category (e.g., a face object type) without further analysis. In other embodiments, detecting the object and identifying the object category 112 may be performed separately. For example, an edge detection analysis may be used to determine boundaries of an object, and properties of the object that can be determined from the image data 110, such as the object's shape, color, position within the image relative to other objects, etc., may be used to determine an object category (e.g., an object type) of the object.

The object sample module 134 may be executed by the processor 120 to select a portion of the image data 110, such as a set of pixels that corresponds to the object. The image processing system 102 may also determine object quality values 114 (e.g., a sharpness value, a blurriness value, particular quality coefficients, etc.) based the portion of the image data corresponding to the object. The processor 120 may send the object quality values 114 to the comparator 142.

In some embodiments, the processor 120 may generate the object quality values 114 that include quality coefficients that correspond to the basis representation 180. For example, the processor 120 may be configured to deconstruct (e.g., decompose) the portion of the image data 110 based on the patches 1-N included in the basis representation 180 and to assign, based on the portion of the image data 110, coefficient values to each patch of the basis representation 180.

The comparator 142 may be configured to compare the object quality values 114 (based on the portion) to the object category metrics 140 (e.g., known representations of object visual quality descriptors) associated with the object category 112. For example, the object category metrics 140 may include threshold values or threshold ranges and the comparator 142 may determine whether the object quality values (based on the portion) satisfy the threshold values or threshold ranges. Thus, the object category metrics 140 may be used as a reference to determine a quality of the portion (that corresponds to and is representative of the object).

Based on the comparison, the comparator 142 may generate a result 116 that indicates whether the representation of the object within the image is a good quality, a low quality, a high quality, etc. The result 116 may include an outcome of the comparison, the object category metrics 140, or a combination thereof. The result 116 may be provided to the processor 120.

The comparator 142 may be embodied in hardware, software, or a combination thereof. Although illustrated separate from the processor 120, in some embodiments the comparator 142 may be included in or be part of the processor 120. In other embodiments, the processor 120 may be configured to perform operations described herein with reference to the comparator 142.

The result/action module 136 may be executed by the processor 120 to determine an action 118 based on the result 116. The action 118 may be output (to another device or to another component that includes the image processing system 102) by the processor 120 and/or may be executed by the processor 120. For example, the action 118 may be associated with the image data 110. To illustrate, when the result 116 indicates that an image quality associated with the object is acceptable, the image processing system 102 may determine that an image quality of the object within the image is acceptable and may determine to maintain one or more settings, parameters, and/or image data values. Accordingly, the action 118 may include generating an indication that the image quality of the object is acceptable.

As another example, the action 118 may be associated with modifying parameters or settings associated with the image (e.g., the image data 110). To illustrate, when a quality of the object within the image is determined to be a low quality based on the comparison, an image resolution parameter and/or a frame rate parameter of an image capture device that generated the image data 110 may be changed (e.g., increased) to generate a higher quality image. Other parameters that may be adjusted include an encoding parameter (e.g., a compression parameter), a bandwidth parameter, a bitrate parameter, an image capture device mode parameter, or a combination thereof.

Additionally or alternatively, the action 118 may be associated with modifying the image data 110 corresponding to the object. To illustrate, when the portion of the image data 110 corresponding to the object is determined to be at a low quality based on the comparison, one or more pixel values associated with the object may be changed to improve a quality of the representation of the object.

Additionally or alternatively, the action 118 may be associated with providing a notification based on the result 116 of the comparison. To illustrate, if the comparison indicates that a quality of the representation of the object is significantly different than expected, the processor 120 may provide an indication (e.g., to a control device or to a user via a display that is coupled to the processor 120) that the image may have been altered. For example, when the portion of the image data 110 corresponding to the object is determined be a very high quality (e.g., uniform color and/or texture, well lit, etc.), the processor 120 may initiate the action 118 to generate a notification (e.g., a message) indicating that the image may have been previously altered or tampered with prior to the image processing device receiving the image data 110.

During operation, the image processing system 102 (or the processor 120) may receive the image data 110 corresponding to an image. Based on the image data 110, the processor 120 may be configured to detect an object represented within the image and may determine the object category 112 corresponding to the object. The processor 120 may further be configured to provide an indication of the object category 112 to the memory 130 to retrieve the object category metrics 140 associated with the object category 112. The object category metrics 140 corresponding to the object category 112 may be provided to and/or received by the comparator 142.

In addition to determining the object category 112 of the detected object, the processor 120 may be configured select a portion (e.g., a sample) of the image data 110 that corresponds to the object. Based on the portion, the processor 120 may be configured to determine object quality values 114 associated with the object. The object quality values 114 may be representative of an image quality of an entirety of the object. In some embodiments, the processor 120 may be configured to select multiple portions of the image data 110 that correspond to the object and to determine object quality values 114 for each portion or to determine a single set of object quality values, such as an average set of object quality values, based on the multiple portions. The object quality values 114 may be received by the comparator 142.

The comparator 142 may be configured to perform a comparison of the object quality values 114 to the object category metrics 140 associated with the object category 112. Based on the comparison, the comparator 142 may be configured to generate the result 116 that indicates a quality of the object represented within the image. For example, the results 116 of the comparison may indicate that the object quality values 114 of the portion are blurry. The result 116 may be received by the processor 120.

Based on the result 116, the processor 120 may be configured to initiate the action 118. For example, when the result 116 indicates that the object quality values 114 of the portion (associated with the object) are blurry, the action 118 may be associated with modifying the image data 110 corresponding to the object to improve (e.g., sharpen) a representation of the object within the image. In some embodiments, the processor 120 may be configured to implement the action 118 and to provide an output, such as modified image data, corresponding to the executed action 118.

In a particular embodiment, the image processing system 102 may be included in a camera device that includes a camera configured to generate the image data 110. The camera may include multiple image capture settings, such as a portrait setting, an action setting, a fireworks setting, etc., as illustrative, non-limiting examples. The camera may capture an image of a scene while the camera is set to a particular image capture setting and may generate the image data 110 based on the captured image. The image processing system 102 may be aware of (e.g., informed of) the particular image capture setting. For example, when the particular image capture setting is the portrait setting, the image processing system 102 may receive an input indicating that the camera is configured in the portrait setting. Accordingly, the image processing system 102 may access the object category metrics 140 from the object category repository 138 that are likely to be used with the portrait setting, such as face object category metrics, eyes object category metrics, hair object category metrics, etc.

Responsive to receiving the image data 110, the image processing system 102 may make a determination of a quality of a representation of one or more objects based on the image data 110. In particular, the image processing system 102 may identify a particular object based on the particular image capture setting and provide a notification as to the quality of the particular object. For example, when the particular image capture setting is the portrait setting, the image processing system 102 may identify a person (e.g., a face) based on the image data 110 and initiate a notification that indicates a quality of the representation of the person within the captured image. To illustrate, the notification may indicate that the image of the person is a high quality image. Alternatively, the notification may indicate that the image of the person is poor quality (e.g., blurry or low-lit). Additionally or alternatively, the notification may suggest an alternate image capture setting that may provide a better quality image of the person. In some embodiments, the image processing system 102 may adjust the image capture settings of the camera and prompt a user of the camera to capture another image using the adjusted settings. For example, the image processing system 102 may be configured to automatically adjust the image capture setting or may request permission from the user to adjust the image capture settings.

In another particular embodiment, the image processing system 102 may be configured to receive an input that indicates a desired visual quality of a particular object category. For example, the input may be received at the processor 120 and may indicate that objects associated with a tree object category are to appear blurry in an image (or video). As another example, the input may indicate that objects associated with a face object category are to appear well-lit within an image (or video). Accordingly, when the processor 120 receives the result 116 that indicates a quality of a representation of an object that is included in the particular object category, the processor 120 may determine whether the quality is the same as the desired visual quality indicated by the user input. If the quality is the same as the visual quality indicated by the user input, the processor 120 may generate the action 118 that indicates that the quality of the object is acceptable. If the quality of the representation of the object is different than the desired visual quality indicated by the user input, the processor 120 may initiate the action 118 to modify the image data 110 that corresponds to the object to generate the desired visual quality indicated by the user input. For example, the processor 120 may identify coefficient values that correspond to the desired visual quality indicated by the user input and may cause the image data 110 corresponding to the object to be regenerated or modified based on the identified coefficient values.

In some embodiments, the user input may indicate (e.g., define) a minimum visual quality or multiple acceptable visual qualities. Accordingly, the image processing system 102 may determine whether a quality of an object within an image meets (e.g., satisfies) the minimum visual quality or has one of the multiple acceptable visual qualities. If the quality of the representation of the object is acceptable, the processor 120 may generate the action 118 to indicate that the quality of the representation of the object is acceptable. If the quality of the representation of the object does not meet the minimum visual quality, the processor 120 may generate the action 118 to modify the image data 110 corresponding to the object to meet the minimum visual quality and/or may generate the action 118 to include a notification indicating that the minimum visual quality is not satisfied. If the quality of the object is not one of the multiple acceptable visual qualities, the processor 120 may generate the action 118 to include a notification that the quality of the representation of the object does not meet (e.g., does not satisfy) the desired multiple acceptable visual qualities.

In a particular embodiment, the image processing system 102 may be configured to identify when an image (or a representation of an object within the image) has been tampered with, such as when visual characteristics (e.g., a quality) of the image have been previously altered. To illustrate, the object category metrics 140 may define a good quality for a particular object category. When a particular result 116 is generated for an object and indicates that the representation of the object is a high quality image, the processor 120 may determine that the visual quality is higher than expected (e.g., based on a visual quality associated with the portion of the image) and may generate a notification that indicates that the image may have been previously modified. For example, when a good quality for a particular object category indicates that an object should have a textured quality (e.g., a textured appearance), the processor 120 may generate a notification that the image including the object was previously altered when the result 116 indicates that the visual quality of the object is smooth.

In a particular embodiment, the image processing system 102 may determine a quality of a representation of an object within an image based on identification of an object category associated with the object and based on at least one other object within the image that is of the same object category or a different object category. To illustrate, the object category repository 138 may cross-reference object category metrics for different object categories. For example, a hair object category may be cross-referenced with a face object category. As another example, a chair object category may be cross-reference with a person object category. Cross-referencing different object category metrics may provide an indication of how objects from different object categories are expected to appear when they are in the same image. For example, an acceptable visual quality of a person positioned away from a chair may be a higher visual quality than a person next to or on a chair. As another example, the person positioned away from that chair may have a range of acceptable visual qualities that is smaller than a range of acceptable visual qualities of the person next to or on the chair. In some embodiments, the acceptable visual qualities of a particular object category may be different based on whether multiple objects of a particular object category are identified within an image. For example, a single person detected within an image may have a range of acceptable visual qualities that is smaller than a range of acceptable visual qualities when multiple people are detected within the image.

In some implementations, when the image data 110 corresponds to a sequence of video frames, the system 100 may maintain quality metrics data for objects that have appeared in one or more video frames of the sequence of video frames. When a particular frame of the sequence of video frames is received (e.g., the particular frame being received subsequent to the one or more video frames), the system 100 may compare the quality metrics data to corresponding quality metrics data in the particular frame. Based on the comparison, the system 100 may identify the onset of tampering or altering of a video, or the onset of object quality degradation due to motion blur.

Additionally or alternatively, when the image data 110 includes three-dimensional (3D) image or video data, the system 100 may be able to determine whether or not a particular 3D object is artificially placed within the image and may provide a notification when the image was altered to include the 3D object. In some implementations, the system 100 may be configured to modify an appearance of the 3D object to make the 3D object appear more natural within a scene. To illustrate, the 3D object may be modified and/or adjusted responsive to the action 118.

By detecting and identifying different objects represented within the image, the image processing system 102 may be able to perform object-by-object based quality assessment of the image. For example, the image processing system 102 may determine a quality of individual objects represented within the image and may advantageously initiate (and/or) perform actions directed to individual objects as opposed to performing actions to an image as a whole. Accordingly, actions directed towards a particular object represented within the image may not alter (e.g., have a negative impact on) a quality of other objects represented within the image. Additionally, by indexing the object category repository 138 by object categories, the image processing system 102 may be able to access particular objects category metrics to be used as a reference for an object based on an object category of the object. Accordingly, the image processing system 102 may make a determination as to a quality of a representation of the object within an image based on the particular object category metrics that are associated with the object category.

Figure 2:
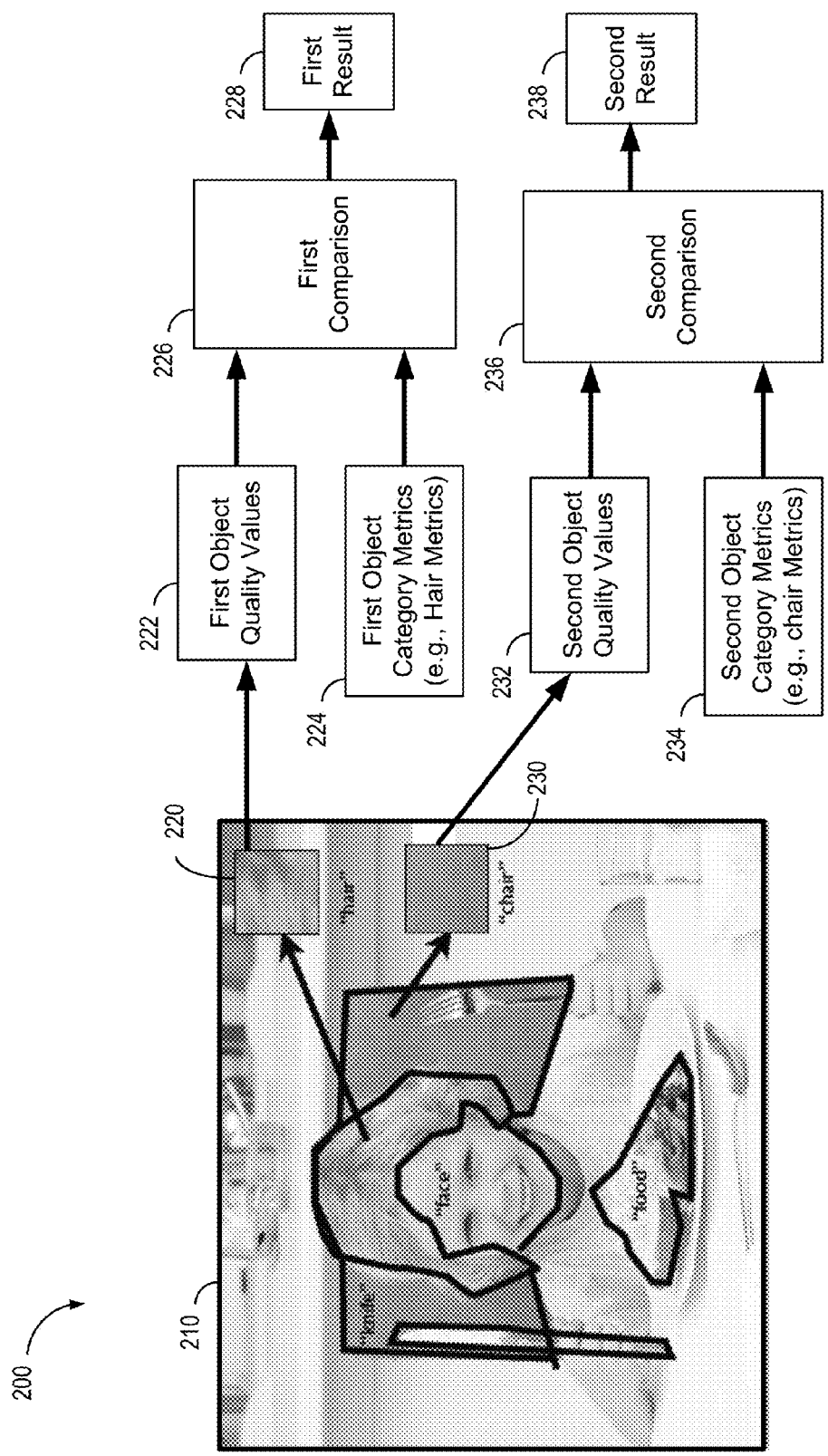
FIG. 2 is a block diagram of an embodiment to illustrate operation of the image processing system of FIG. 1.

Referring to FIG. 2, a block diagram to illustrate operation of the image processing system 102 of FIG. 1 is depicted and generally designated 200. For example, FIG. 2 is illustrative of the image processing system 102 detecting multiple objects represented within an image data (e.g., an image 210) and determining an image quality result for each object.

The image 210 may correspond to image data, such as the image data 110 of FIG. 1, that is received by the image processing system 102. The image processing system 102 may detect and identify multiple objects represented within the image 210. For example, the image processing system 102 may determine an object category (e.g., an object type), such as the object category 112 of FIG. 1, for each detected object. To illustrate, based on the image 210, the image processing system 102 may identify a "hair" category, a "chair" category, a "knife" category, a "food" category, and a "face" category. For purposes of describing FIG. 2, the hair category may correspond to a first object and the chair category may correspond to a second object.

The image processing system 102 may select at least one sample (e.g., portion) of each detected object. For example, a first portion 220 of the hair may be selected, and a second portion 230 of the chair may be selected. The first portion 220 and the second portion 230 may be the same size sample or they may be different sizes. For each sample, the image processing system 102 may generate corresponding object quality values, such as the object quality values 114 of FIG. 1. To illustrate, the image processing system 102 (e.g., the processor 120) may generate first object quality values 222 based on the first portion 220 associated with the hair sample and may generate second object quality values 232 based on the second portion 230 associated with the chair sample.

The image processing system 102 may access object category metrics, such as the object category metrics 140, for each detected object. For each object, corresponding object category metrics may be retrieved based on the identified object category (e.g., object type) of the object. To illustrate, first object category metrics 224 (e.g., hair category metrics may be accessed for the first object (e.g., the hair), and second object category metrics 234 may be access for the second object (e.g., the chair). The first object category metrics 224 may include known representations of first object visual quality descriptors (e.g., learned object-based quality descriptors) that indicate and/or define acceptable quality metrics for objects having the first object type (e.g., the hair category). The second object category metrics 234 may include known representations of second object visual quality descriptors (e.g., learned object-based quality descriptors) that indicate and/or define acceptable quality metrics for objects having the second object type (e.g., the chair category). In a particular embodiment, the first object category metrics 224 are different than the second object category metrics 234.

A first comparison 226 may be performed between the first object quality values 222 and the first object category metrics 224. For example, the first comparison 226 may be performed by the comparator 142 of FIG. 1. Based on the first comparison 226, a first result 228 may be generated that indicates a quality of the first object (e.g., the hair) represented within the image 210.

A second comparison 236 may be performed between the second object quality values 232 and the second object category metrics 234. For example, the second comparison 236 may be performed by the comparator 142 of FIG. 1. Based on the second comparison 236, a second result 238 may be generated that indicates a quality of the second object (e.g., the chair) represented within the image 210.

The first result 228 and the second result 238 may be provided to a processor 120 of the image processing system 102. The processor 120 may be configured to determine an action based on the results 228, 238. For example, the processor 120 may determine a single action based on the results 228, 238 or may determine an action for each of the results 228, 238. In some embodiments, the processor 120 may determine multiple actions for a particular result. To illustrate, the processor 120 may determine a first action(s) associated with modifying parameters associated capture, storage, and/or display of the image 210, modifying the image 210 (e.g., image data) corresponding to the first object, and/or providing a notification based on the result 228 of the first comparison 226. Additionally, the processor 120 may determine a second action(s) associated with modifying parameters associated capture, storage, and/or display of the image 210, modifying the image 210 (e.g., image data) corresponding to the second object, and/or providing a notification based on the result 238 of the second comparison 236.

In a particular embodiment, the image processing system 102 initiates a first action to modify first values of the image 210 associated with the first object (e.g., the hair) and/or a second action to modify second values of the image 210 associated with the second object (e.g., the chair). In some embodiments, the image processing system 102 may be configured to modify the first values responsive to the first action and/or to modify the second values responsive to the second action. Based on the first modified values and/or the second modified values, the image processing system 102 may output a second image (e.g., second image data) that corresponds to a modified version of the image 210.

In another particular embodiment, the first action is associated with modifying parameters associated with image processing of the image 210 based on the first comparison 226 to generated modified parameters. The parameters may include or correspond to an image resolution parameter, a frame rate parameter, an encoding parameter, a bandwidth parameter, a bitrate parameter, an image capture device mode parameter, or a combination thereof. Additionally or alternatively, the second action may be associated with modifying second values associated with the second object represented within the image 210 data based on the second comparison 236. For example, modifying the second values may include modifying pixel values (e.g., pixel intensity values) corresponding to the second object (e.g., the chair). Additionally or alternatively, the second action may be associated with providing a notification based on the second result 238. For example, the second result 238 may indicate that the second object quality values 232 of the second portion 230 (e.g., the second sample) were a higher quality than the second object category metrics 234. Based on the second object quality values 232 being the higher quality, the notification may indicate that the image 210 was previously altered (e.g., that the representation of the chair within the image 210 was previously altered).

By detecting and identifying different objects represented within the image 210, the image processing system 102 may be enabled to perform object-by-object based quality assessment of the image 210. Accordingly, the image processing system 102 may initiate an action directed towards a particular object, such as the first object (e.g., the hair), represented within the image 210 without altering (e.g., having a negative impact on) a quality of another object, such as the second object (e.g., the chair), represented within the image 210. Additionally or alternatively, the image processing system 102 may initiate an action directed towards another particular object, such as the second object (e.g., the chair), represented within the image 210 without altering (e.g., having a negative impact on) a quality of another object, such as the first object (e.g., the hair), represented within the image 210.

Figure 3:
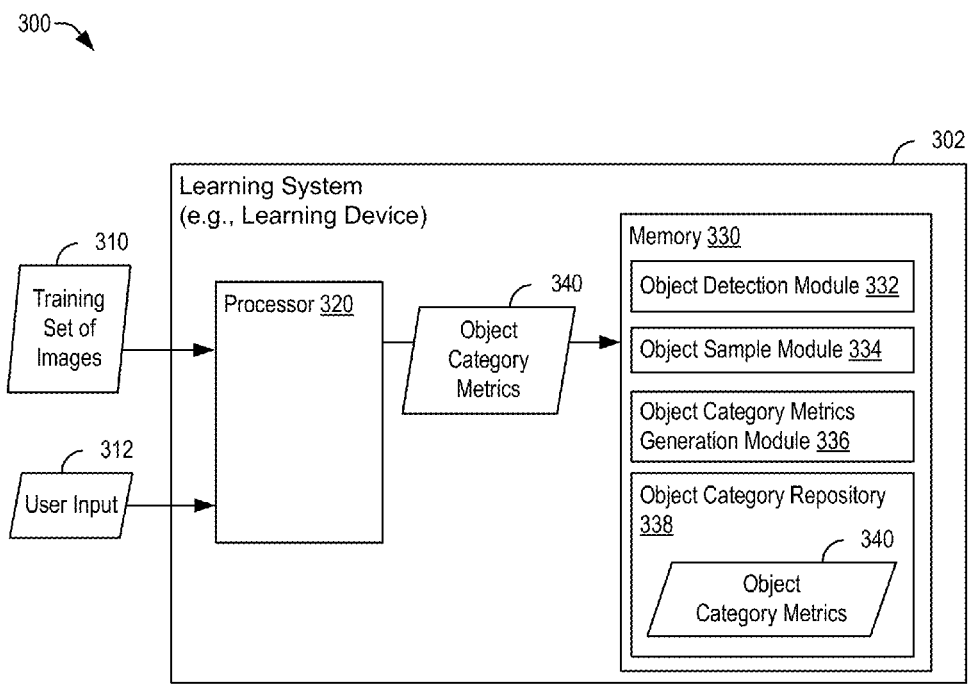
FIG. 3 is a block diagram of an embodiment of a system to generate object descriptors associated with visual quality.

Referring to FIG. 3, a block diagram of a particular embodiment of a system 300 to generate object descriptors associated with a visual quality of an object category. The system 300 may include a learning system 302 (e.g., a learning device) that is configured to generate a basis representation and/or to generate object descriptors (e.g., known representations of object visual quality descriptors), such as the object category metrics 140 of FIG. 1, the first object category metrics 224, or the second object category metrics 234 of FIG. 2.

The learning system 302 may include a processor 320 and a memory 330 coupled to the processor 320. The processor 320 may be configured to receive a training set of images 310 and/or a user input 312, as described herein. Although the processor 320 is illustrated as a single processor, in some embodiments the processor 320 may include multiple processors. For example, the processor may processor may be a single processor or multiple processors, such as a digital signal processor (DSP), a central processing unit (CPU), a graphical processing unit (GPU), or a combination thereof.

Training set of images 310 may include multiple images that each includes a representation an object having the same object classification (e.g., the same object type). For example, the training set of images 310 may each include a representation of an object, such as a chair. In some embodiments, the training set of images 310 may include video data that includes the object. A first training image of the training set of images 310 may include a representation of a first chair, and a second training image of the training set of images 310 may include a representation of a second chair that is distinct from the first chair. Each image (e.g., a representation of the object within each image) of the training set of images 310 may have a same image quality. For example, the training set of images 310 may be associated with sharp images of the object. As another example, the training set of images 310 may be associated with blurry images of the object, low-light images of the object, bright images of the object, etc. The training set of images 310 having the same image quality associated with the object may enable the learning system 302 to learn (e.g., generate) a basis representation and/or object category metrics 340 that correspond to the object.

The user input 312 may enable an operator (e.g., an administrator or a user) of the learning system 302 to input data, such as parameters and/or settings, to be used by the learning system 302. For example, the data may identify an object category (e.g., an object classification) associated with the training set of images 310, a quality associated with the training set of images, a location of the object within each image of the training set of images 310, a number of images included in the training set of images 310, or a combination thereof. In some implementations, the user input 312 may be received responsive to particular images of the training set of images 310. For example, the training set of images 310 may include images of objects that have varying image qualities and the user input 312 may identify images having an acceptable image quality. Accordingly, the user input 312 may be used by the learning system 302 to generate the object category metrics 340.

The memory 330 may be accessible to the processor 320 and may store data including settings, media content, and other information. For example, the memory 330 may store data, such as an object category repository 338 (e.g., object category metrics). The object category repository 338 may include or correspond to the object category repository 138 of FIG. 1. The object category repository 338 may be indexed using different object categories such that object category metrics 340 may be stored to and/or accessed from the object category repository 338 based on an identified object category (e.g., an object type). The object category metrics 340 included in the object category repository 338 may include a collection of metrics, such as known representations of object visual quality descriptors (e.g., learned object-based quality descriptors).

The object category repository 338 may include basis representations and/or object category metrics 340 for a number of object categories (e.g., object types). For example, the object category repository 338 may include first object category metrics that correspond to a first object category and may include second object category metrics that correspond to a second object category. The object category metrics 340 may include or correspond to the object category metrics 140, the table 170 of FIG. 1, the first object category metrics 224, and/or the second object category metrics 234 of FIG. 2, as illustrative, non-limiting examples.

The data stored in the memory 330 may also include instructions executable by the processor 320 to perform operations. For purposes of description, instructions for the processor 320 are illustrated in FIG. 3 as organized in functional modules. For example, the memory 330 may include an object detection module 332, an object sample module 334, and an object category metrics generation module 336, as illustrative, non-limiting examples. In some implementations, one or more of the modules stored in the memory 330, such as the object detection module 332, the object sample module 334, and/or the object category metrics generation module 336, may be loaded from the memory 1330 into the processor 320 and may be executed by the processor 320.

The object detection module 332 may be executed by the processor 320 to detect a representation of an object within each image of the training set of images 310. In some embodiments, a location of the representation of the object within each image may be known to the processor 320. For example, a user input 312 may identify the location (e.g., an x-y coordinate) of the representation of the object within each image of the training set of images 310. In other embodiments, the user input 312 may identify an object to be detected and the processor 320 may execute the object detection module 332 to detect the identified object in each image of the training set of images 310.

The object sample module 334 may be executed by the processor 320 to select a portion of the representation of the object, such as a sample of a set of pixels (e.g., a patch) that corresponds to the object. In some embodiments, the processor 320 may select multiple portions of the representation of the object within an image of the training set of images 310.

The object category metrics generation module 336 may be executed by the processor 320 to generate the object category metrics 340 that correspond to an object associated with the training set of images 310. To illustrate, for each sample selected by the processor 320 when executing the object sample module 334, the processor 320 may execute the object category metrics generation module 336 to generate object quality values (e.g., a sharpness value, a blurriness value, particular quality coefficients, etc.). For example, when the training set of images 310 is associated with a particular object category, the learning system 302 may generate a basis representation, such as the basis representation 180 of FIG. 1, and quality coefficients using a process, such as sparse sampling, nearest neighbors, clustering, etc., as described further herein.

To illustrate, for each sample, the processor 320 may decompose (e.g., deconstruct) the sample into one or more patches and generate quality coefficients for each patch. The patches corresponding to each of the samples associated with the training set of images 310 may collectively form the basis representation, such as the basis representation 180 of FIG. 1. Additionally, the processor 320 may combine the quality coefficients determined for each of the samples to generate resultant quality coefficients that characterize a visual quality of an object corresponding to a particular quality of the training set of images 310. For example, when the training set of images 310 are associated with a sharp visual quality of a particular object, the resultant quality coefficients (e.g., the object category metrics 340) may be indicative of a sharp image quality of an object category corresponding to the training set of images 310. As another example, when the training set of images 310 are associated with a blurry visual quality of the particular object, the resultant quality coefficients (e.g., object category metrics 340) may be indicative of a blurry image quality of an object category corresponding to the training set of images 310. In some embodiments, the processor 320 may combine patches from all of the samples to generate the basis representation and may combine all of the quality coefficients to generate the resultant quality coefficients. As another example, the processor 320 may combine less than all of the patches and/or the quality coefficients to generate the object category metrics 340. In some embodiments, the resultant quality coefficients (e.g., the object category metrics 340 may include a range of values that define a particular image quality.

During operation, the learning system 302 may receive the user input 312 that indicates that the learning system 302 is to receive a number of images included in the training set of images 310, where each image includes an object that has a visual quality. For example, the user input 312 may indicate that the learning system 302 is to receive the training set of images 310 that includes 100 images of cars having a sharp image quality.

The learning system 302 may receive the training set of images 310 and detect a representation of the object within each image of the training set of images 310. For each detected object, the processor 320 may select a sample of the object. Based on samples selected by the processor 320, the processor 320 may generate the object category metrics 340 (e.g., a basis representation and/or quality coefficients) that define the visual quality of the object (e.g., the object category corresponding to the training set of images 310.

The processor 320 may send the object category metrics to the memory 330 to be included in the object category repository 338. The object category repository 338 or the object category metrics 340 may be provided from the memory 330 of the learning system 302 to a memory of another device or system, such as the memory 130 of the image processing system 102 of FIG. 1. The object category repository 338 and/or the object category metrics 340 may enable the other device or system to select a sample of an object detected in an image and to determine a visual quality of the detected object based on the object category repository 338 and/or the object category metrics 340.

In a particular embodiment, the learning system 302 may be configured to generate (e.g., populate) the object category repository 338 to enable the image processing system 102 of FIG. 1 to analyzing quality of image content at an object level. The learning system 302 may be configured to derive one or more object dictionaries (basis) for each object category based on one or more training sets of images, such as the training set of images 310. The dictionary (or basis), such as the basis representation 180 of FIG. 1, may provide a generalized representation for image patches from different instances of objects (e.g., different model cars, different peoples' faces, etc.), thus enabling higher precision analysis for future, unknown object instances.

The learning system 302 may be configured to create a single dictionary that is unified across multiple quality conditions, as illustrated by the table 170 of FIG. 1. For example, a dictionary D may be learned across a set of training images Y (e.g., the training set of images 310), where the input image patches y need not be synthesized input samples across C different quality conditions (blurry, poor lighting, blockiness, etc.). When the dictionary D is unified across multiple quality conditions, a size of the dictionary D may be large enough to accommodate different quality conditions. Empirically, a single combined dictionary can capture the same information and be smaller than multiple independent dictionaries because the independent case often contains repeated representations.

The learning system 302 may use numerical weights (e.g., coefficients or parameters) along with a basis representation (e.g., an object dictionary) to decompose pixel-based images into the dictionary domain. Object category metrics, such as the object category metrics 140 of FIG. 1, the first object category metrics 224, the second object category metrics 234 of FIG. 2, or the object category metrics 340 of FIG. 3 may include a representation or encoding for image patches that is uniform for different quality conditions (herein referred to as a dictionary).

The numerical weights for different quality conditions may be used (e.g., by the image processing system 102 of FIG. 1) to transform content, such as a representation of an object within an image, between different quality conditions (e.g., making something that is "smooth" into something that is "blurry", herein referred to as a condition transform). Additionally, the number weights may be used (e.g., by the image processing system 102 of FIG. 1) to determine an effectiveness of a transform (e.g., how well does a "blurry" transform represent a current object's condition, herein a distance metric). Additionally, using the numerical weights, an object may be resynthesized after undergoing transformations in the dictionary domain. To illustrate an object may be resynthesized by the processor 120 of FIG. 1.

To enable the learning system 302 to generate object category metrics, multiple (possibly overlapping) training sets Y may be defined for different object categories (e.g., different semantic categories). An object category (e.g., a semantic object category) may be associated with a collection of images that shares a common human-understandable textual label, such as a "car", a "chair", "hair", "mountains", etc. The combination of multiple categories may be defined as an object lexicon with L entries. For a particular object category l, a training set $Y^l$ may be used generate to generate a dictionary $D^l$. In some embodiments, the dictionary $D^l$ may be associated with sparse codes $x_i^l$, as described herein.

To generate a dictionary D, it may be assumed that an image i is represented by a matrix I of pixel values having a width w and a height h, such as $I_i^{w \times h}$. With no loss of generality, this discussion focuses on a single channel image patch with grayscale pixel values. A vectorized version of pixel values may be represented by $y_i$ of length d where $d = w \times h$ and multiple images $y_i$ (i=1, ..., N) are composed into training sets $Y=[y_1, ..., y_n] \in \mathbb{R}^{d \times N}$, wherein N is a positive integer greater than one. The following discussion provides examples of how a dictionary D (e.g., a basis) can be learned to represent image patches in a numerical, non-pixel domain.

In a particular embodiment, the dictionary D may be a cluster-based dictionary. Cluster-based dictionaries may combine similar image patches into a fixed set of words by simple k-means or hierarchal k means where k is a positive integer. A dictionary $D=[d_1, ..., d_K] \in \mathbb{R}^{d \times K}$ may be produced using vectorized image patches y and may be commonly referred to as a bag of words (BoW) or bag of features (BoF) approach. An image patch y may be represented as a quantized code x that is strictly assigned to a nearest neighbor, soft-weighted to a number of neighbors, voted into a number of discrete embeddings, or even mapped probabilistically, as illustrative, non-limiting examples. After each approach, the representation may be a posterior vector (probabilistic or discrete)—or a mostly-zero vector with a few bins set to non-zero where there was a high correlation for quantization. Utilizing this vector representation, histogram-based distance metrics and kernels, such as the cosine and $x^2$, may be utilized.

In another particular embodiment, the dictionary D may be a sparse code dictionary. For a sparse code dictionary, a dictionary $D=[d_1, ..., d_K] \in \mathbb{R}^{d \times K}$ may be learned with the sparse codes $X=[x_1, ..., x_N] \in \mathbb{R}^{K \times N}$, typically posed as the following optimization problem:

$$D^*, X^* = \underset{D,X}{\operatorname{argmin}} \|Y - DX\|_F^2$$

$$\text{s.t. } \|x_i\|_p \leq \lambda, \forall i \in [1, N]$$

$$\|d_j\|_2 = 1, \forall j \in [1, K],$$

where $\|Y\|_F$ denotes the Frobenius norm defined as $\|Y\|_F = \sqrt{\Sigma_{i,j} |Y_{i,j}|^2}$, $\lambda$ is a positive constant, and the constraint $\|x_i\|_p \leq \lambda$ promotes sparsity in the coefficient vectors. The constraints $\|d_j\|_2 = 1$, j=1, ..., K, keep the columns of the dictionary (or dictionary atoms) from becoming arbitrarily large that may result in very small sparse codes.

After the dictionary D is learned, given a vectorized image patch y, its sparse code x can be computed by minimizing the following objective function:

$$\|y-Dx\|_2^2 \text{ s.t. } \|x\|_p \leq \lambda,$$

where $\|X\|_p$ can either be the $l_0$ or $l_1$ norm of x. For $l_0$ enforcement, orthogonal matching pursuit (OMP) is a common greedy selection algorithm, and $l_1$ typically uses the objection function expressed in least absolute shrinkage and selection operator (LASSO) problems.

The dictionary D may enable an image processing system, such as the image processing system 102 of FIG. 1 to detect tampering of one or more objects by detecting transform residual errors above a threshold T across all possible quality conditions within an image as determined based on:

$$\underset{i,c}{\operatorname{argmax}} \left\| G_c^l - \hat{G}_{c,i}^l \right\|^2 > T,$$

where G is the local inverse transformation for object i with semantic (e.g., object) category l from a quality condition c.

In a particular embodiment, the dictionary D may be utilized to perform transform functions that either enhance or degrade an image patch presented by a sparse code according to:
$\mathcal{F}_c x = x_c$ (degrade)
$x = G_c x_c$ (enhance)
where transform $\mathcal{F}_c$ is a projection matrix that maps a non-degraded code x to a second code $x_c$ corresponding to a degraded quality condition. Similarly, an inverse transform function $G^c$ synthesizes non-degraded (enhanced) quality conditions for codes. Transforms can be computed for a single object code x or across an entire training set Y where single-object (local) transforms are denoted as $\hat{\mathcal{F}}_c$ and $\hat{G}_c$. Single-object transforms may also be used and may be constructed using techniques such as background models, model adaptations, or even naive clustering.

In another particular embodiment, the dictionary D may be utilized to perform transform functions associated with latent semantic analysis (LSA). LSA is a formulation that enables a document to broken down into its semantics as defined by its collection of words. Using the dictionary D, an image patch may be substituted for the document in the LSA formulation and the dictionary components may be substituted for the words of the LSA formulation.

Typically, LSA assumes unsupervised (or non-labeled) samples, but the transforms described herein may assume that different quality conditions c are available. To accommodate this additional information, LSA may be performed repeatedly for sets of image patches y that are grouped by object categories or other transform methods may be utilized.

In another particular embodiment, a kernelized linear discriminant analysis (KLDA) may be used to perform a transform. The KLDA may use non-linear projection and may incorporate quality conditions (labels). In some embodiments, each of the above described transform techniques may use a similarity metric that is defined for (and/or common to) each representation.

An example of transforming an encoding may begin with an arbitrary patch i=5 of a shoe (l=1) that is encoded as $x_{i=5}^{l=1}$. An encoding of that patch with blurry quality (c=1) would be $x_{i=5,c=1}^{l=1}$ and is produced by: $\mathbb{R}_{c=1} x_{i=5}^{l=1}$. Similarly, a blurry (c=1) version of an arbitrary patch i=8 of a car (l=2) is encoded as $x_{i=8,c=1}^{l=2}$.

An example of a local transform may begin with a blurry quality (c=1) of an arbitrary patch i=3 of a car l=2 having an encoding is $x_{i=3,c=1}^{l=2}$. The inverse transform learned from the training set Y may be $G_{c=1}$. An inverse transform for the specific patch i=3 may be $\hat{G}_{c=1,x=3}$.

By generating the object quality values (e.g., the object category metrics 340) and populating the object category repository 338, the learning system 302 may define one or more object based quality dictionaries. The object category repository 338 may be provided to one or more devices that include an image processing system, such as the image processing system 102 of FIG. 1, to enable the image processing system to perform object-by-object based quality assessment of the images. Additionally, the object category repository 338 may enable the image processing system to perform transformation functions and to identify tampered (e.g., altered) image data.

Figure 4:
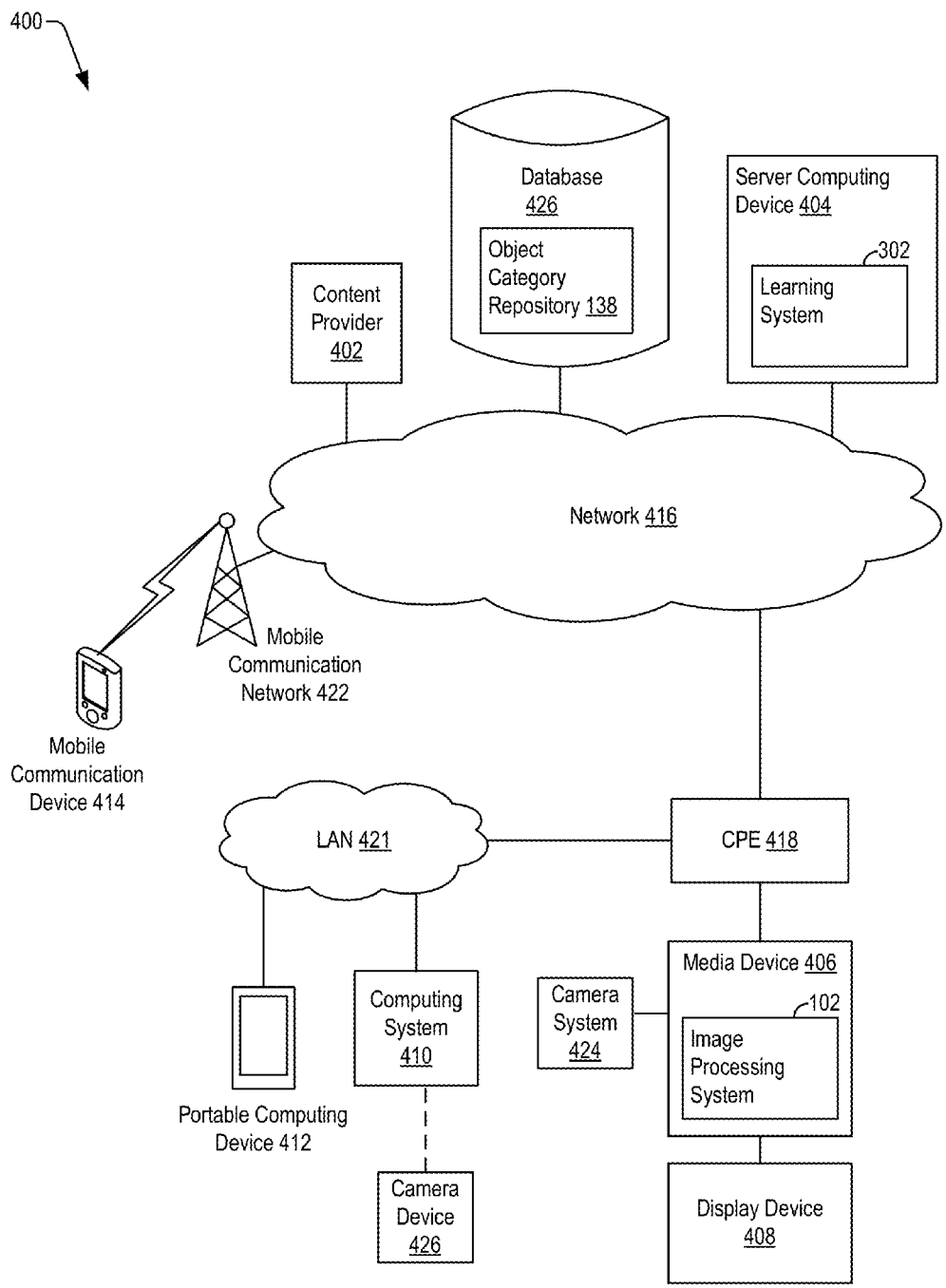
FIG. 4 is a block diagram of an embodiment of a system that is configured to communicate content to a device.

FIG. 4 is a block diagram of a particular embodiment of a system 400 that is configured to communicate media content to a device. The media content may include, but is not limited to, video content from a video service or service provider, television programming, media on-demand (e.g., video-on-demand, gaming-on-demand, etc.), pay per view programming, audio programming, video game content, other content, or combinations thereof that is streamed to the device. The media content may be obtained by a user device from a content provider 402 via a server computing device 404. The server computing device 404 may be associated with a service that provides media content to users, or the server computing device 404 may be associated with a service provider that provides one or more communication services to customers (e.g., an interne service provider that provides one or more of telecommunication services, data services, and television programming services).

The user device may be one of a plurality of user devices associated with a user. The plurality of user devices may include, but is not limited to, one or more media devices 406 coupled display devices 408, one or more computing systems 410, one or more portable computing devices 412 (e.g. laptop computers, tablet computers, personal digital assistants, etc.), one or more mobile communication devices 414 (e.g., a mobile phone), other devices, or combinations thereof. In some embodiments, a camera device 446 may be selectively coupled to the computing system 410 or another device of the system 400. The camera device 446 may be configured to receive media content or other data from the content provider 402, the server computing device 404, and/or a service provider. The number and type of user devices associated with a particular user may vary. A media device 406 may be a set-top box device, game system, or another device able to send media content to the display device 408 and able to communicate via a network 416 (e.g., the internet, a private network, or both). The media device 406 may be an integral component of the display device 408 or a separate component.

One or more of the user devices 406-414 may receive media content, such as streaming media content, from the network 416 via customer premises equipment (CPE) 418. The CPE 418 may facilitate communications between the network 416 and each media device 406 coupled to the CPE 418. The CPE 418 may also facilitate communications to and from the network 416 and one or more user devices (e.g., user devices 410-414) coupled by a wireless connection or a wired connection to a local area network (LAN) 421 established by, or accessible to, the CPE 418. The CPE 418 may be an access point to the network 416. The CPE 418 may include a router, a wireless router, a local area network device, a modem (e.g., a digital subscriber line modem or a cable modem), a residential gateway, security features, another communication device, or combinations thereof. A user device of the user devices 406-414 (e.g., the portable computing device 412 and the mobile communication device 414) may be able to receive the media content (e.g., the streaming media content) via a mobile communication network 422 and the network 416 when the user device is not in communication with the network 416 via the CPE 418 or another network access point.

Each of the user devices 406-414 (and the camera device 446) may include a processor and a memory accessible to the processor. A particular processor may execute instructions stored in an associated memory to perform operations. The operations may include, but are not limited to, accessing the network 416, receiving a stream of the media content, and outputting the media content. A particular user device of the user devices 406-414 may include an integrated camera system or an external camera system 424 that enables collection of data about a user or users of media content output by the particular user device to a display device coupled to the particular user device. The media device 406 may include the image processing system 102 of FIG. 1. The media device 406 may use the image processing system 102 to perform an image quality assessment of images and/or video generated, stored, and/or displayed at the media device 406 or another device coupled to the media device 406, such as the display device 408. Although the image processing system 102 is illustrated as being include in the media device 406, one or more of the other user device 408-414, the camera device 446, the CPE 418, the camera system 424, or the display device 408 may include or be associated with a corresponding image processing system 102.

The system 400 may include a database 426. The database 426 may store the object category repository 138 of FIG. 1 (and/or the object category repository 338 of FIG. 3). The object category repository 138 may be accessible to or provided to each of the user devices 406-414, the CPE 418, the camera system 424, or the camera device 446. For example, the media device 406 may access the server computing device 404 and request a copy of at least a portion of the object category repository 138. Based on the request, the server computing device 404 may cause the copy to be provided from the database 426 to the media device 406.

The server computing device 404 may include a processor and a memory accessible to the processor. The memory may store data including settings, media content, and other information. In some embodiments, the database 426 may be stored in a portion of the memory of the server computing device 404. The data may also include instructions executable by the processor to perform operations. The server computing device 404 may include the learning system 302. The learning system 302 may be configured to generate and/or populate the object category repository 138. Although the learning system 302 is illustrated as being included in the server computing device 404, the learning system 302 may be included in another device of the system 400, such as the media device 406, the computing system 410, the camera system 424, etc.

Figure 5:
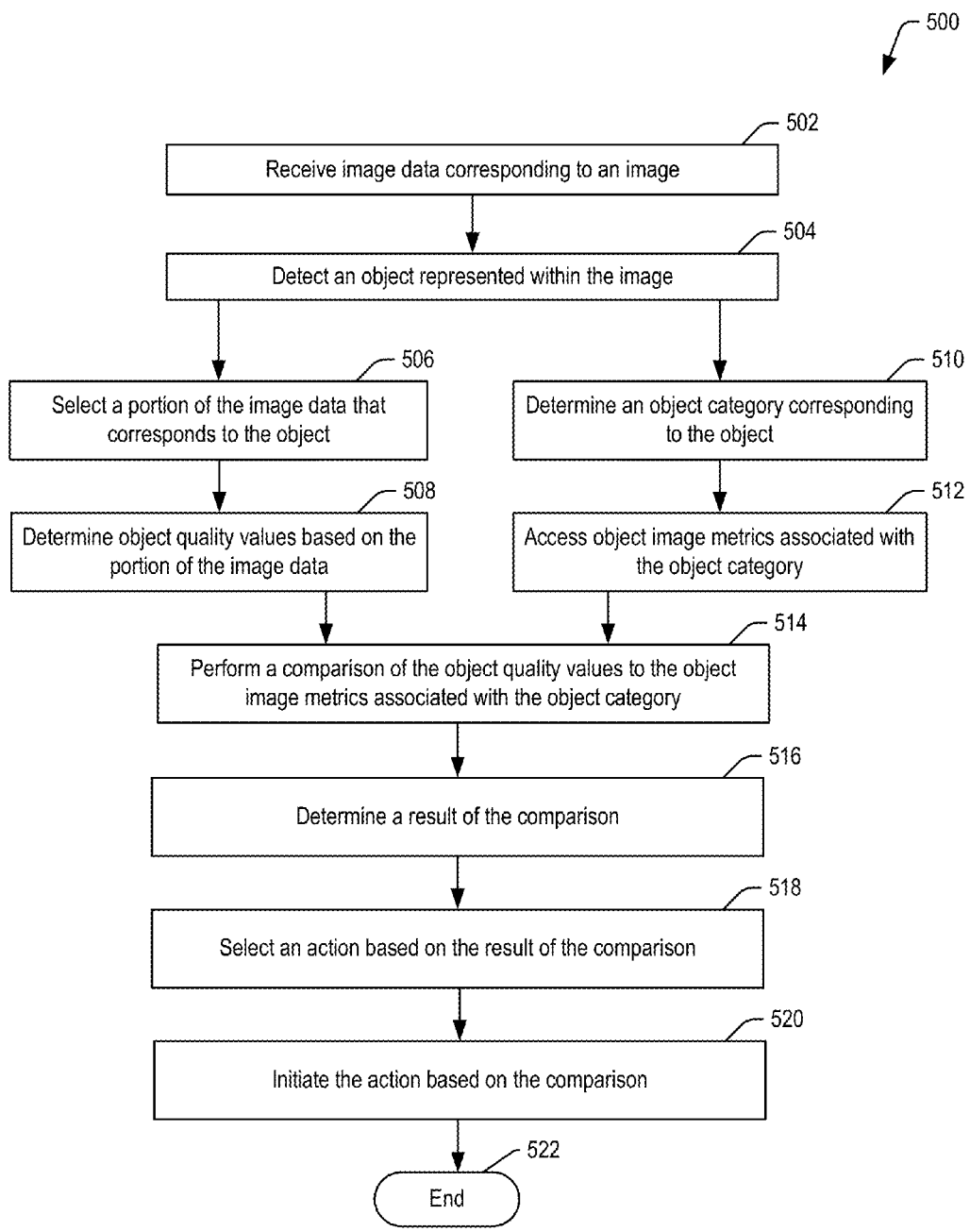
FIG. 5 is a flowchart of an embodiment of a method to perform object based image processing.

Referring to FIG. 5, a flowchart of a particular embodiment of a method 500 to perform object based image processing is shown. The method 500 may be performed by the image processing system 102 of FIG. 1, 3, or 4. At 502, image data corresponding to an image is received. The image data may include or correspond to the image data 110 of FIG. 1 and/or the image 210 of FIG. 2. For example, the image processing system 102 (e.g., the processor 120) may receive the image data.

The method 500 includes detecting an object represented within the image, at 504. For example, the processor 120 of FIG. 1 may be configured to detect the object. The method 500 includes selecting a portion of the image data that corresponds to the object, at 506, and determining object quality values based on the portion of the image data, at 508. For example, the object quality values may include or correspond to the object quality values 114 of FIG. 1, the first object quality values 222, or the second object quality values 232 of FIG. 2.

The method 500 includes determining an object category corresponding to the object, at 510. For example, the object category may include or correspond to the object category 112 of FIG. 1. The method 500 includes accessing object category metrics associated with the object category, at 512. For example, the object category metrics may include or correspond to the object category metrics 140 of FIG. 1, the first object category metrics 224, or the second object category metrics 234 of FIG. 2. The object category metrics may be accessed based on the determined object category that corresponds to the object.

The method 500 includes performing a comparison of the object quality values to the object category metrics associated with the object category, at 514. The comparison may be performed by the comparator 142 of FIG. 1. For example, the comparison may include or correspond to the first comparison 226 or the second comparison 236 of FIG. 2.

The method 500 may include determining a result of the comparison, at 516, and selecting an action based on the result of the comparison, at 518. For example, the result may include or correspond to the result 116 of FIG. 1, the first result 228, or the second result 238 of FIG. 2. The result may indicate whether the object quality values are associated with an acceptable image quality of the object.

The method 500 includes initiating the action based on the comparison, at 520. The processor 120 of the image processing system 102 may initiate the action to be performed at or by another device or may initiate the action to be performed by the processor 120. For example, the image processing system 102 may generate the action, such as the action 118 based on the result. The method 500 may end at 522.

Various embodiments disclosed herein describe image processing systems (e.g., image processing devices) configured to perform a quality assessment of an image on an object-by-object basis. An image processing system, such as the image processing system 102 of FIGS. 1 and 3, may detect and identify an object represented in an image. Based on an object type of the identified object, known-object descriptors (e.g., object category metrics) may be accessed and/or retrieved. The known-object descriptors may define one or more visual quality attributes for objects having the identified object type. The image processing device may also determine quality values (e.g., a sharpness value, a blurriness value, particular quality coefficients, etc.) based on a portion of the image data corresponding to the object. The image processing device may compare the quality values (based on the portion) to the known-object descriptors (e.g., the object category metrics) associated with the object category. Based on the comparison, the image processing system may make a determination as to a quality of the representation of the object within the image. The quality determination corresponding to the object may be made independent of a quality of a representation of another object within the image. Thus, the image processing system may be configured to perform image quality assessment of the image on an object-by-object basis for individual objects represented within the image.

Figure 6:
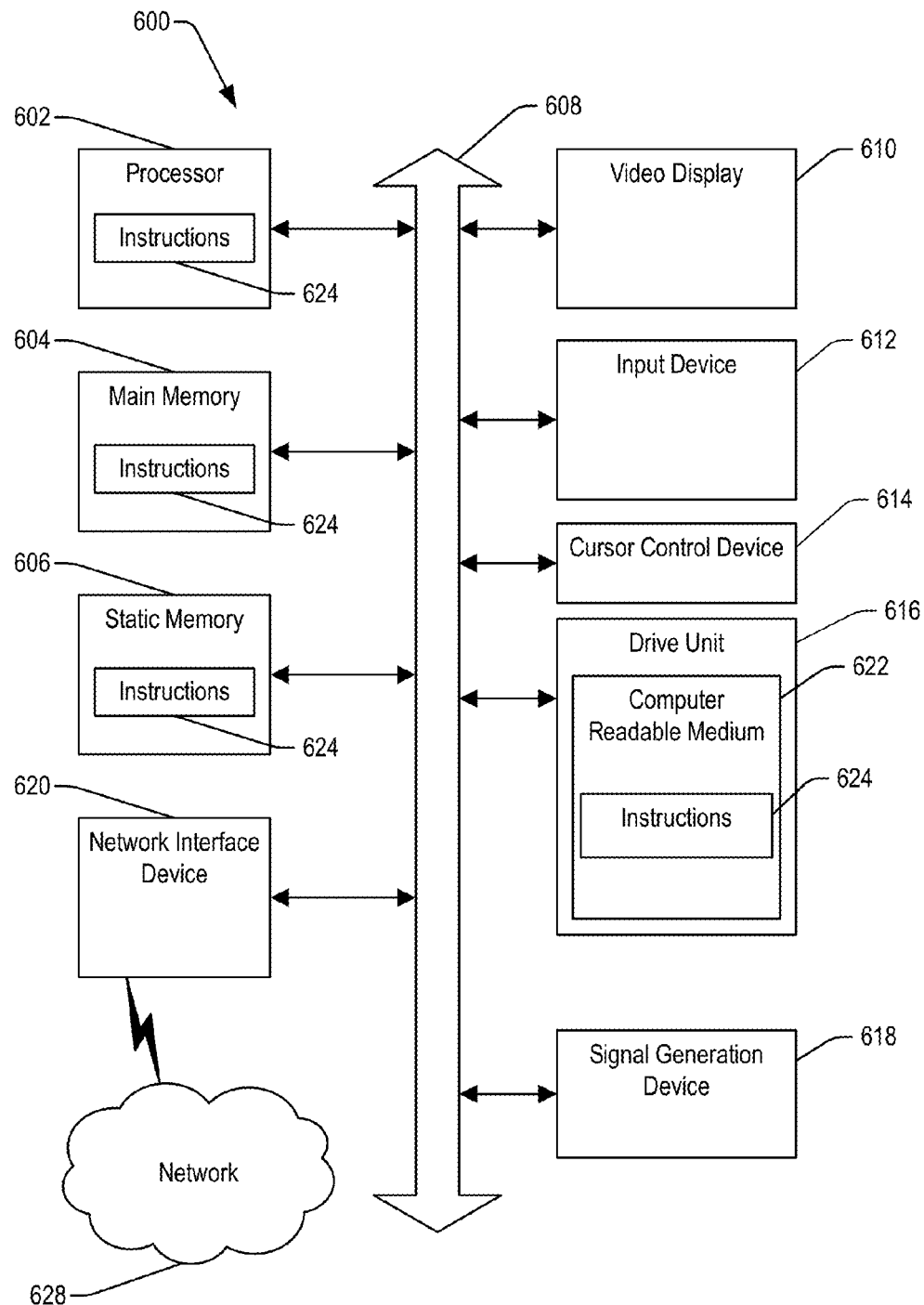
FIG. 6 is a block diagram of an illustrative embodiment of a general computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the image processing system 102, the learning system 302, the content provider 402, the server computing device 404, the CPE 418, the media device 406, the display device 408, the computing system 410, the portable computing device 412, the mobile communication device 414, the database 426, the camera device 446, the camera system 424 of FIG. 4, or combinations thereof.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), a digital signal processor (DSP), or a combination thereof. Moreover, the computer system 600 may include a main memory 604 and a static memory 605, which can communicate with each other via a bus 608. As shown, the computer system 600 may further include a video display unit 610, such as a liquid crystal display (LCD), a flat panel display, a solid state display, or a lamp assembly of a projection system. Additionally, the computer system 600 may include an input device 612, such as a keyboard, and a cursor control device 614, such as a mouse. The computer system 600 may also include a drive unit 616, a signal generation device 618, such as a speaker or remote control, and a network interface device 620. Some computer systems 600 may not include an input device (e.g., a server may not include an input device). The processor 602 may include or correspond to the processor 120 of FIG. 1, the processor 320 of FIG. 3, or both. The memories 604, 605 may include or correspond to the memory 130 of FIG. 1, the memory 330 of FIG. 3, or both.

In a particular embodiment, as depicted in FIG. 6, the drive unit 616 may include a computer-readable storage device 622 in which one or more sets of instructions 624, e.g. software, can be embedded. As used herein the term "computer-readable storage device" refers to an article of manufacture and excludes signals per se. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable storage devices. The instructions 624 in the drive unit 616, the main memory 604, the static memory 606, the processor 602, or combinations thereof may include the object detection module 132, the object sample module 134, the result/action module 136 of FIG. 1, the object detection module 332, the object sample module 334, the object category metrics generation module of FIG. 3, or a combination thereof. The drive unit 616 (e.g., the computer-readable storage device 622) may include or correspond to the memory 130 of FIG. 1, the memory 330 of FIG. 3, or a combination thereof.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

The present disclosure includes a computer-readable storage device 622 that stores instructions 624 or that receives, stores, and executes instructions 624, so that a device connected to a network 628 may communicate voice, video or data over the network 628. While the computer-readable storage device is shown to be a single device, the term "computer-readable storage device" includes a single device or multiple devices, such as a centralized or distributed database, and/or associated caches and servers that store one or more sets of instructions. The term "computer-readable storage device" shall also include any device that is capable of storing a set of instructions for execution by a processor.

In a particular non-limiting, exemplary embodiment, the computer-readable storage device can include a solid-state memory such as a memory card or other package that houses one or more non-volatile read-only memories. Further, the computer-readable storage device can be a random access memory or other volatile re-writable memory. Additionally, the computer-readable storage device can include a magneto-optical or optical medium, such as a disk or tapes or other storage device. Accordingly, the disclosure is considered to include any one or more of a computer-readable storage device and successor devices, in which data or instructions may be stored.

It should also be noted that software that implements the disclosed methods may optionally be stored on a computer-readable storage device, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosed embodiments are not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving, at an image processing device, image data corresponding to an image;
determining object quality values based on a portion of the image data, the portion corresponding to an object represented in the image;
accessing object category metrics associated with an object category corresponding to the object; and
generating a notification indicating that the image data has been altered in response to a result of a comparison of the object quality values to the object category metrics, the result indicating alteration of the portion of the image data.

2. The method of claim 1, further comprising:
selecting a second portion of the image data corresponding to a second object represented in the image;
determining second object quality values based on the second portion;
accessing second object category metrics associated with a second object category corresponding to the second object; and
performing a second comparison of the second object quality values to the second object category metrics, wherein generating the notification is further responsive to a second result of the second comparison indicating alteration of the second portion of the image data.

3. The method of claim 1, further comprising:
detecting the object represented in the image based on the image data;
selecting the portion of the image; and
determining the object category corresponding to the object.

4. The method of claim 3, further comprising comparing the object quality values to basis representations in an object category repository.

5. The method of claim 1, wherein the result indicates the alteration of the portion in response to a determination that a transform residual error for a particular object quality metric of the object for a quality condition associated with the image is greater than a tamper threshold.

6. The method of claim 1, wherein the object comprises a representation of a portion of a person.

7. The method of claim 6, wherein the portion of the person comprises a face of the person or hair of the person.

8. The method of claim 1, further comprising modifying an image processing parameter of an image processing device based on the result, the image processing parameters comprising an image resolution parameter, a frame rate parameter, an encoding parameter, a bandwidth parameter, a bitrate parameter, or an image capture device mode parameter.

9. The method of claim 1, further comprising:
modifying values of the image data corresponding to the object based on the comparison to generate modified image data; and
initiating output of a second image based on the modified image data.

10. The method of claim 1, wherein the image comprises a frame of a video stream.

11. A system comprising:
a processor; and
a memory accessible to the processor, the memory comprising instructions that, when executed by the processor, cause the processor to execute operations including:
receiving image data corresponding to an image;
determining object quality values based on a portion of the image data, wherein the portion corresponds to an object represented in the image;
accessing object category metrics associated with an object category corresponding to the object;
performing a comparison of the object quality values to the object category metrics; and generating a notification indicating that the image data has been altered based on a result of the comparison.

12. The system of claim 11, wherein the processer and the memory are included in a mobile device.

13. The system of claim 11 wherein the processor and the memory are included in a media device.

14. The system of claim 11, wherein the result of the comparison indicates alteration of the portion in response to a determination that a transform residual error for a particular object quality metric of the object for a quality condition associated with the image is greater than a tamper threshold.

15. The system of claim 11, wherein the operations further include:
  selecting a second portion of the image data corresponding to a second object represented in the image;
  determining second object quality values based on the second portion;
  accessing second object quality category metrics associated with a second object category corresponding to the second object; and
  performing a second comparison of the second object quality values to the second object quality category metrics, wherein generating the notification is further responsive to a second result of the second comparison indicating alteration of the second portion of the image data.

16. A computer-readable storage device comprising instructions executable by a processor to perform operations comprising:
  receiving image data corresponding to an image;
  selecting a portion of the image data corresponding to an object represented in the image;
  determining object quality values based on a portion of the image data, wherein the portion corresponds to an object represented in the image;
  accessing object category metrics associated with an object category corresponding to the object; and
  generating a notification indicating that the image data has been altered based on a result of a comparison of the object quality values to the object category metrics.

17. The computer-readable storage device of claim 16, wherein the operations further include:
  selecting a second portion of the image data corresponding to a second object represented in the image;
  determining second object quality values based on the second portion;
  accessing second object category metrics associated with a second object category corresponding to the second object; and
  performing a second comparison of the second object quality values to the second object category metrics.

18. The computer-readable storage device of claim 16, wherein the operations further include performing the comparison, wherein the comparison indicates alteration of the portion in response to a determination that a transform residual error for a particular object quality metric of the object for a quality condition associated with the image is greater than a tamper threshold.

19. The computer-readable storage device of claim 16, wherein the object category metrics include a sharpness metric, a blurriness metric, a low-lighting metric, a texture metric, a color metric, or a combination thereof.

20. The computer-readable storage device of claim 16, wherein the operations further comprise:
  detecting the object represented in the image based on the image data;
  selecting the portion of the image based on the object; and
  determining the object category corresponding to the object.

* * * * *